United States Patent Office 2,812,526
Patented Nov. 12, 1957

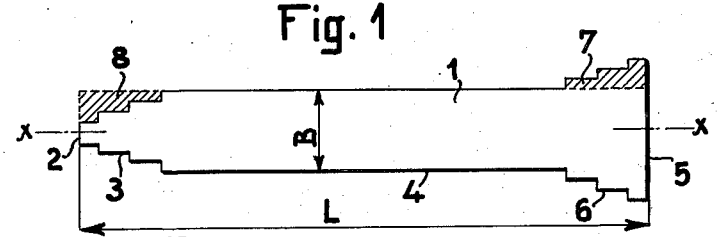
Fig. 1
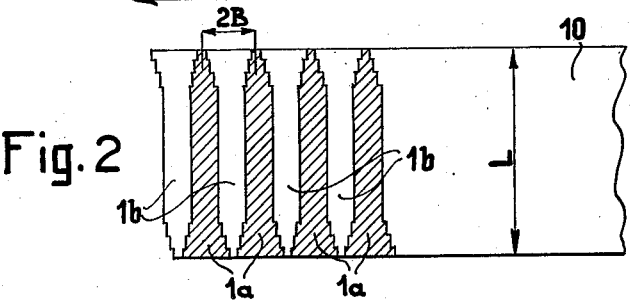
Fig. 2
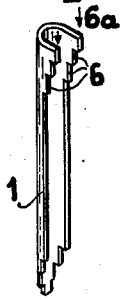  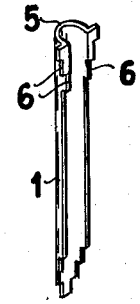 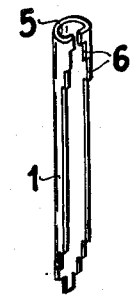
Fig. 3   Fig. 4   Fig. 5   Fig. 6
   
Fig. 7   Fig. 8   Fig. 9   Fig. 10
  
Fig. 11   Fig. 12   Fig. 13

2,812,526

PROCESS OF MANUFACTURING SHEET METAL NAILS

Waldemar Porak and Hermine Porak, Vienna, Austria, assignors to Hans Arledter, South Lee, Mass.

Application February 7, 1955, Serial No. 486,640

1 Claim. (Cl. 10—34)

This invention relates to a nail, which is reduced in steps at the end to be driven in, and to a process for manufacturing such nails without waste from a strip of sheet metal.

Various embodiments of the sheet metal nail according to the invention are shown and the method whereby it is manufactured is illustrated in the drawing. Fig. 1 shows the piece of sheet metal for making the nail, Fig. 2 the scheme for the manufacture of the nail; Figs. 3 to 6 show finished nails in perspective, and Figs. 7 to 10 are top plan views showing the heads of these nails. Figs. 11, 12 and 13 show cross-sections of further embodiments of nails according to the invention.

According to Figs. 1 and 2 of the drawing the blank 1 cut or punched from the strip of sheet metal 10 has at the end where the nail is to be driven in a stepped reduced portion 3, which is symmetrical in respect of the axis x—x of the nail shank 4. A stepped enlarged portion 6 is provided between the shank 4 and the head end 5. The hatched area 7 of that enlargement is congruent with the hatched area 8 at the other end, where the nail is to be driven in. The width of the strip 10 of sheet metal (Fig. 2), from which the blanks 1, or 1a and 1b are punched, equals the length L of the nail. From such strip of sheet metal the blanks 1a, 1b are obtained by means of a simple blanking tool or punch, which is advanced after each operation by the step 2B, i. e. by twice the width of the sheet metal blank 1. Thus each operation of the blanking tool gives two blanks 1a, 1b without waste.

The blanks thus obtained are bent or rolled to form nails according to Figs. 3 and 7 or 4 and 8.

To prevent the nail (according to Fig. 3) from being deformed or bent by the impact of the driving tool on the projecting stepped edges as the nail is being driven in, the projecting steps are bent either outwardly (Figs. 5 and 9) or inwardly (Figs. 6 and 10). One, two, or all three steps can be bent.

In the illustrative embodiment shown the stepped reduced and enlarged portions have rectangular steps. According to the invention the steps may have sawtooth shape or oblique boundary lines or may be of unequal size, provided that the areas of reduction and enlargement are congruent.

Figs. 11, 12 and 13 show cross-sections of further embodiments of nails according to the invention.

What we claim is:

A method of manufacturing a nail from a metal strip comprising cutting a straight line transversely across the strip between points spaced by equal distances from opposite sides of the strip, cutting a series of equal steps from each point to the nearest side, the two series being cut on opposite sides of the straight line, cutting a second straight line parallel to the first, and cutting associated series of equal steps, the corresponding series on one side of the strip being cut on facing sides of the parallel lines and on the other side of the strip being cut on the far sides of the parallel lines and channeling the blank to form a nail and bending selected of the steps of the upper end so that they are substantially coplanar.

References Cited in the file of this patent

UNITED STATES PATENTS 141,810     Nichols _____ Aug. 12, 1873

FOREIGN PATENTS 647,846     Germany _____ July 14, 1937
663,157     Great Britain _____ Dec. 19, 1951